Sept. 22, 1936. J. S. DULCZEWSKI 2,055,281
TAPE MEASURE
Filed March 29, 1934
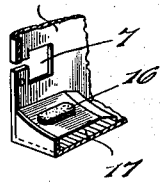
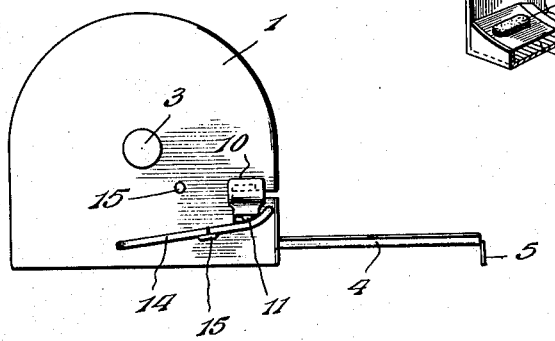
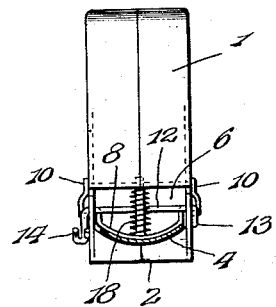
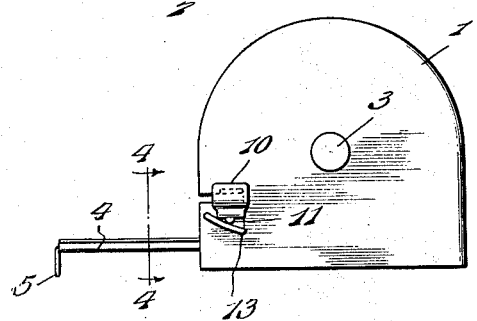
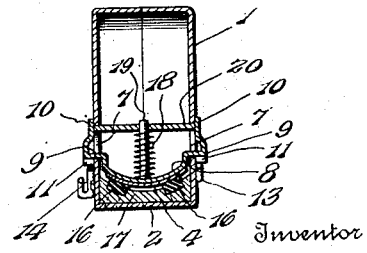
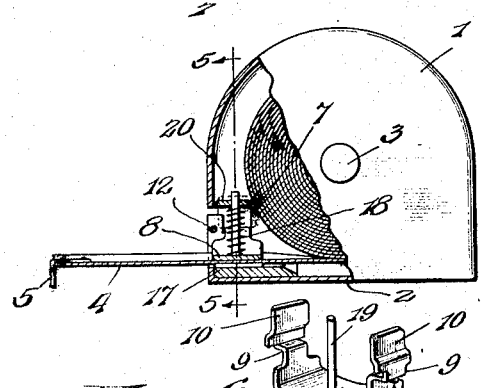

Patented Sept. 22, 1936

2,055,281

UNITED STATES PATENT OFFICE 2,055,281

TAPE MEASURE

John S. Dulczewski, Amsterdam, N. Y.

Application March 29, 1934, Serial No. 718,029

5 Claims. (Cl. 33—138)

This invention relates to tape measures and has for its object the provision of means whereby, when the tape is drawn out from the case to take a measurement, it will be held firmly in the drawn out position until the measurement may be noted upon a record. It is also an object of the invention to provide a tape measure which may be used in the dark or in tight corners to take measurements and in which the withdrawal of the tape will be prevented until the tool may be brought into the light so that the measurement may be read. It is also an object of the invention to provide means for the stated purpose which will be efficient but simple and compact so that it may be applied to any tape measure easily and without burdensome expense. The invention is illustrated in the accompanying drawing and will be hereinafter first fully described and then more particularly defined.

In the drawing,

Figure 1 is a side elevation of a tape measure embodying the present invention.

Figure 2 is a similar view of the opposite side of the device.

Figure 3 is a view similar to Figure 2 with parts broken away and in section.

Figure 4 is a transverse section on the line 4—4 of Figure 2.

Figure 5 is a transverse section on the line 5—5 of Figure 3.

Figure 6 is a detail perspective view of the latch or tape-holding element.

Figure 7 is a detail view of one of the inner friction members.

The case I of the measure may be of any known or approved construction, being preferably of metal and forming a substantially cylindrical shell having a flat base, as indicated at 2. The shell is preferably formed from two similar mating halves held together by a central shaft or rod 3 which will form the support for the inner portion of the tape measure and the volute spring by which the measure is held yieldably retracted and wound. The tape measure is shown at 4 and consists, as usual, of a metal ribbon or strip graduated to indicate inches and fractions of inches in the well-known manner. The tape is provided at its free end with a bracket 5 which constitutes a finger or thumb piece to facilitate its withdrawal and also a stop to impinge against the edge wall of the case and prevent the tape being drawn into the case to such an extent that it cannot be easily manipulated when its use is desired, it being noted that the case is provided with an opening 6 through which the tape plays.

Registering with the edge opening 6, openings 7 are formed in the side walls of the case to accommodate and guide the wings of a latch, which is shown in detail in Figure 6. This latch consists of a gripping portion 8 which is preferably concavo-convex presenting its convex surface to the upper surface of the tape so as to frictionally engage the same and aid in holding it in any position to which it may be drawn. The opposite ends of the gripping member are formed with reduced ends 9 which project through the side openings 7 of the case and play therein, wings 10 rising from the necks and bearing slidably against the outer sides of the case. As shown most clearly in Figure 5, the necks slightly project beyond the sides of the case and the wings are offset to accommodate the projecting portions of the necks, and lugs 11 are provided on the under sides of the projecting portions of the necks. A transverse rock shaft 12 extends through the case and is journaled in the sides thereof, a crank 13 on one end of the shaft bearing upwardly against the adjacent lug 11 and a lever 14 on the opposite end of the shaft likewise acting upon the other lug, stops 15 on the case above and below the lever limiting its movement. The tape 4, as shown clearly in Figures 4 and 5, passes under the latch and rests upon coacting blocks 16 of rubber or other friction-creating material which are fitted in a base block 17 secured in the case at the front end of the same. A spring 18 bears upon the latch to cause it to frictionally hold the tape, and this spring may conveniently be a coiled spring disposed about a centering pin 19 rising centrally from the latch and having its end engaged in a transverse abutment bar 20 secured in the case.

It will be readily understood, from the foregoing description taken in connection with the accompanying drawing, that when the tape is drawn out from the case, as shown in Figures 1, 2, and 3, the opposed tape-engaging members will frictionally engage the same and clamp it so that it will be held in the position to which it has been drawn. If pressure be applied by the thumb or finger of the user to the lever 14, the shaft 12 will be rocked and the lever and the crank 13, acting on the lugs 11 will lift the latch, against the tension of the spring 18, so as to release the tape whereupon the central winding spring will withdraw the tape into the case in wound condition.

My device is exceedingly simple and may be applied to existing tape measures as well as fabricated into tape measures in the course of manufacture. The device may be used in the usual manner of tape measures and when drawn out will be firmly held in the drawn out position so that the measurements may be properly noted until pressure is applied to the lever 14, as has been explained. The device is especially useful in taking measurements in the dark inasmuch as the tape measure will be held in the position to which it has been drawn out until it can be carried into a lighted place where the measurement may be read. The device is also especially adapted for taking inside measurements of door and window frames and similar constructions inasmuch as the case may be placed against one side or jamb of the frame and the tape then drawn out until its free end may be placed against the opposite jamb or side of the frame. The longitudinal dimension of the base is to be then added to the measurement indicated by the tape in order to get the exact measurement of the frame, the case being standardized and usually having a base dimension of two inches.

Having thus described the invention, I claim:

1. The combination with a measuring tape and its case, the tape being withdrawable through an opening in the edge of the case, of friction elements secured in the case below the tape, a latch mounted in the case to bear upon the top of the tape and hold the same to the friction elements whereby to hold the tape in a drawn out position, wings at the ends of the latch slidably engaging the sides of the case, a rock shaft mounted below the latch and having means at its ends to engage under the wings to release the latch, and a spring within the case bearing upon the latch to hold the same yieldably lowered in engagement with the tape.

2. A device of the class described including a case, a tape reeled therein and having an end projecting from the case, means carried by the tape for limiting the end thereof against too great inward movement, said means permitting manual engagement for withdrawal of the tape, said tape being adapted to play through an opening in the case, openings formed in the case adjacent said first mentioned opening, a latch carried by the case and having reduced ends projecting through said second mentioned openings, a rock shaft carried by the case and having a lever for manual engagement, said rock shaft having a crank, said crank and lever being adapted for engagement with the reduced ends of the latch and being adapted for shifting the latch and permitting shifting movement of the tape from a set position.

3. A device of the class described including a case having side walls and an opening, a tape carried in the case and being adapted for withdrawal through the opening, means carried in the case for normally retaining the tape retracted, a latch carried by the case and having a gripping portion adapted to engage the tape and retain it in a desired set position, said latch having reduced ends extending through the walls of the case and wings abutting said walls, said wings providing a guide, a pin upstanding from the gripping portion, an abutment bar carried by the case, a spring carried on the pin and normally urging the latch downwardly, said wings retaining the abutment bar against longitudinal shifting movement, and a lever carried by the case and adapted to engage the latch for elevating the latch against the tension of the spring and permitting release of the tape.

4. A device of the class described including a case having an opening therein, openings formed in the case adjacent said first mentioned opening, said first mentioned opening permitting withdrawal of a tape from the case, a latch carried in the case and having reduced ends carried in said second mentioned openings and being formed with wings, an abutment bar carried by the case, a pin carried on the latch, a spring about the pin and confined between the abutment bar and the latch for normally urging the latch downwardly into engagement with the tape whereby said tape will be retained in a set position, a rock shaft carried by the case and having a crank engageable with an end of the latch, said rock shaft being projected and bent to form a lever engageable with the other end of the latch, and said lever being movable for shifting the rock shaft and engaging the crank and said lever with the latch for raising the latch and permitting retraction of the tape.

5. A device of the class described including a case, a tape therein, said case having an opening, a base block carried in the case adjacent the opening, resilient blocks carried on the base block, said tape being adapted to ride over the blocks through the opening, a latch carried by the case adjacent the opening above the blocks and adapted for normally holding the tape in a set position, and a lever carried by the case and slidably engageable with the latch for raising the latch and releasing the tape for permitting retraction thereof.

JOHN S. DULCZEWSKI.